J. HINEMAN.
AUTOMATIC DIRECTION INDICATOR.
APPLICATION FILED NOV. 3, 1917.
1,321,526.
Patented Nov. 11, 1919.
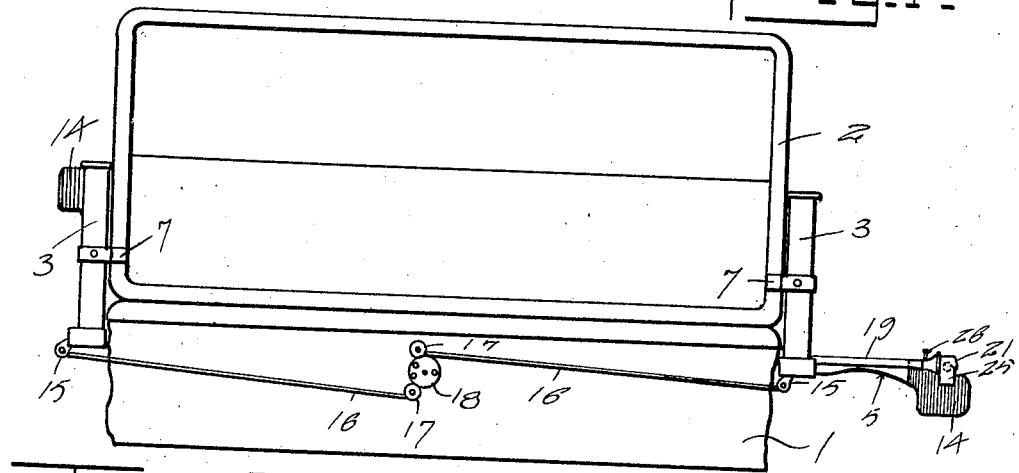
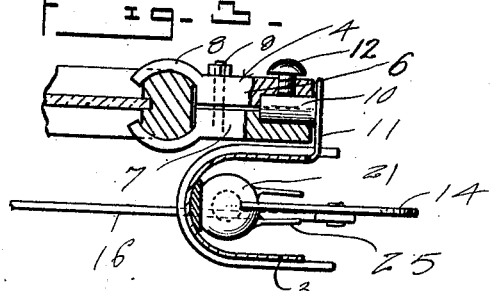
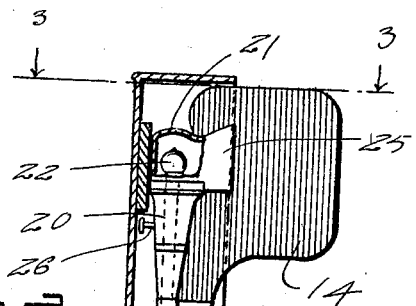
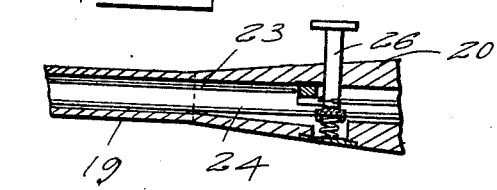
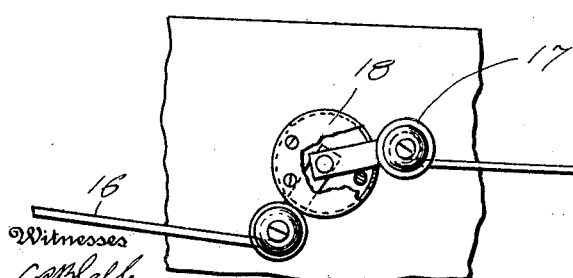
Inventor
J. Hineman,

UNITED STATES PATENT OFFICE.

JACOB HINEMAN, OF SYRACUSE, NEW YORK.

AUTOMATIC DIRECTION-INDICATOR.

1,321,526.  Specification of Letters Patent.  Patented Nov. 11, 1919.

Application filed November 3, 1917. Serial No. 200,113.

*To all whom it may concern:*

Be it known that I, JACOB HINEMAN, a citizen of the United States, residing at Syracuse, in the county of Onondaga and State of New York, have invented certain new and useful Improvements in Automatic Direction-Indicators; and I do hereby declare the following to be a full, clear, and exact description of the invention, such as will enable others skilled in the art to which it appertains to make and use the same.

This invention relates to improvements in direction indicators and has for one of its objects, the provision of a device of this character which can be readily and conveniently operated by the operator of an automobile so that the direction in which a turn is contemplated can be readily signaled to the traffic in front and rear of the respective automobile.

Another object of this invention is the provision of casings or housings secured to the wind shield of an automobile and having located therein signaling members adapted to be swung out of said casings or housings to indicate that a turn is to be made.

A further object of this invention is the provision of means for illuminating the signal members as soon as they exit from the housings or casings so as to make the signal members visible at night time.

A further object of this invention is the provision of a novel means of securing the housings or casings vertically to wind shields of various types such as the kind now employed upon automobiles that are disposed in an inclined plane.

A still further object of this invention is the provision of a direction indicator of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a rear elevation of a direction indicator constructed in accordance with my invention, illustrating the same applied to a wind shield, Fig. 2 is a fragmentary vertical sectional view of the same, Fig. 3 is a longitudinal sectional view taken on the line 3—3 of Fig. 2, and Fig. 4 is a detail sectional view illustrating means of completing a circuit upon the signaling members swinging exteriorly of the housings or casings.

Referring in detail to the drawing, the numeral 1 indicates the dash of an automobile on which is mounted the usual wind shield 2. The foregoing description relates to a well known construction of automobile and to which my invenion is applied.

Vertical housings or casings 3 are detachably secured to each side of the wind shield 2 by means of clamps 4 and have their outer walls open for the purpose of permitting signaling members 5 to swing exteriorly and horizontally thereof when desired, and which will be hereinafter more fully described.

The clamps 4 are identical in construction and reference to one is thought sufficient for both. The clamp 4 consists of sections 6 and 7 that are provided with curved portions 8 to grip the wind shield 2 and are tightly clamped thereon by means of a set bolt 9. The sections 6 and 7 are recessed to receive a member 10 formed upon an extension 11 carried by the casings or housings 3. The sections 6 and 7 of the clamp 4 are capable of rotation upon the member 10 and are held in adjusted position by means of a set screw 12. By releasing the set screw 12 the sections 6 and 7 of the clamp 4 may be turned about the member 10 so as to apply the housings or casings 3 vertically to wind shields that are disposed upon an inclined plane. The extension 11 which supports the member 10 is struck out from the housings or casings 3 as clearly illustrated in Fig. 3. The signaling members 5 are constructed from comparatively thin and flattened material and are pivoted within the lower ends of the casings or housings 3 as illustrated at 13 and have enlarged signaling portions 14 formed upon the upper end which are painted or otherwise coated various colors, but preferably red. The signaling members 5 have angular extensions 15 formed upon their pivoted ends to which are pivoted operating rods 16. The operating rods 16 are in turn pivotally connected to actuating handles 17 that are pivotally mounted within a casing 18 carried by the dash 1 of the automobile whereby the signaling members may be swung exteriorly of the housings or casings 3 into horizontal positions as illustrated in Fig. 1 for the purpose of indicating to the traffic that a turn is to be made.

Cylindrical members 19 are formed upon one edge of the signaling members 5 and have one end enlarged as illustrated at 20 to which is formed a suitable housing 21. The housings 21 have located therein electric lamps 22 which have connected thereto conductors 23 and 24 which are in turn connected in the ordinary manner to a suitable electrical source for the purpose of illuminating the electric lamps 22. The housings 21 have formed thereon suitable reflectors 25 that are disposed upon each side of the signaling portions 14 of the signaling members 5 so as to direct the rays of light from the electric lamps upon said portions.

Spring actuated circuit closers 26 are mounted upon the enlarged portions 20 of the cylindrical members 19 and are adapted to break the circuit to the electric lamps 22 when the signaling members 5 are swung within the casings or housings 3, and which will automatically complete a circuit to the electric lamps when the signaling members are swung exteriorly of the casing into signaling position by the springs thereof.

While I have shown and described the preferred embodiment of my invention, it will be understood that minor changes in construction, combination, and arrangement of parts may be made without departing from the spirit and scope of the invention as claimed.

What is claimed is:—

A direction indicator comprising a casing, means securing the casing to an automobile, a signaling member pivoted within said casing and having its free end enlarged and flattened to form a signaling portion, a cylindrical member formed on said signaling member, a housing formed on said cylindrical member and adapted to contain a lamp, a reflector formed on said housing, and disposed upon each side of the signaling portion to direct the rays of light from the lamp thereon.

In testimony whereof I affix my signature in presence of two witnesses.

JACOB HINEMAN.

Witnesses:
EDSON H. KING,
EDWARD J. MCNEELY.

Copies of this patent may be obtained for five cents each, by addressing the "Commissioner of Patents, Washington, D. C."